Feb. 20, 1968  M. S. NACHBAR  3,370,193
ELECTROLYSIS-RESISTANT ELECTRON DISCHARGE DEVICE
Filed Jan. 22, 1964
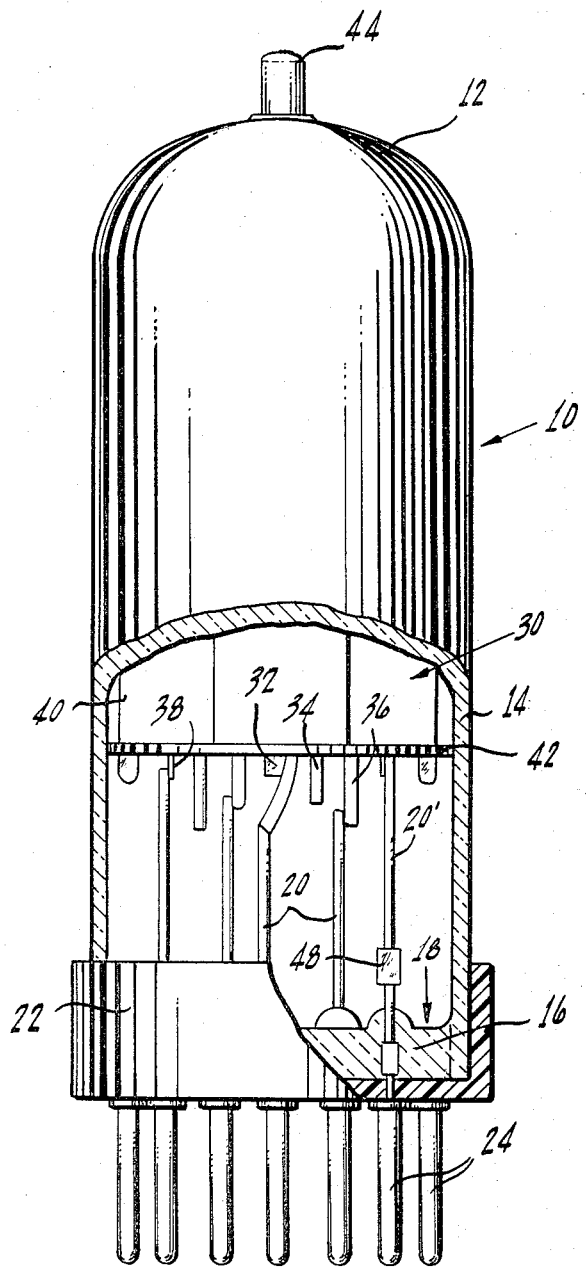
INVENTOR.
MILTON. S. NACHBAR
BY
William A. Zalesak
ATTORNEY

United States Patent Office 3,370,193
Patented Feb. 20, 1968

3,370,193
ELECTROLYSIS-RESISTANT ELECTRON
DISCHARGE DEVICE
Milton S. Nachbar, Matawan, N.J., assignor to Radio
Corporation of America, a corporation of Delaware
Filed Jan. 22, 1964, Ser. No. 339,422
3 Claims. (Cl. 313—54)

This invention relates to articles of manufacture having glass parts which are subject to the phenomenon known as electrolysis. The invention has particular utility in high voltage electron discharge tubes having evacuated glass envelopes.

Although not fully understood, it is known that when glass is subjected either to electron bombardment or to large electrostatic gradients, a gradual decomposition of the glass occurs. This is referred to as electrolysis of the glass, and is believed to be caused by the movement of positively and negatively charged ions through the glass in response to electrostatic fields impressed across the glass. The movement of the ions causes disassociation of the glass molecules and decomposition of the glass.

In certain types of articles of manufacture the decomposition of the glass causes failure of the article. Thus, for example, in certain types of vacuum tubes having glass envelopes, decomposition of the glass causes the glass to give off gases within the vacuum tubes, or allows passage of air through the glass envelope. In either event, the gases within the tubes cause failure of the tubes.

Various means have been developed for preventing or slowing the rate at which electrolysis occurs for increasing the useful life of articles of manufacture subject to this problem. Such means, however, are generally undesirably expensive. With respect to high voltage electron discharge tubes, for example, it is known that lead glass is more resistant to electrolysis than lime glass. Lead glass, however, as well as other high resistance glasses, is considerably more expensive than lime glass which is commonly used in low voltage type electron discharge tubes not subject to electrolysis problems.

An object of this invention is to provide a novel means for retarding the rate of electrolysis in the glass parts of high voltage electron discharge devices.

Another object of this invention is to provide a novel and relatively inexpensive means for retarding the rate of electrolysis in high voltage electron discharge devices to such an extent that relatively low resistance and inexpensive glass envelopes or parts may be used.

For achieving these objects in accordance with one embodiment of this invention, a radioactive material is mounted on the article of manufacture preferably adjacent the regions of the article where electrolysis normally occurs; more specifically on the tube electrode mount assembly within the evacuated envelope.

A further description of the invention follows in connection with a description of a drawing which shows one type of article of manufacture in which this invention has utility.

The drawing shows an electron discharge device partially broken away and in side elevation.

Electron discharge device 10 shown in the drawing may be used as a horizontal deflection amplifier in television receiver circuits. As shown, anode voltages of the order of 10,000 volts are encountered in such circuits. Device 10 comprises a glass envelope 12 including a glass bulb 14 and a glass wafer or header 16 of a stem assembly 18. Stem assembly 18 is hermetically sealed to the lower inside wall of bulb 14. Stem assembly 18 comprises the glass wafer 16 and a plurality of support and conductive leads 20, 20' extending through wafer 16 is vacuum tight relation therewith. Surrounding the lower end of the glass envelope 12 is an insulating base 22 having a plurality of pins 24. Each pin 24 receives and is electrically connected to the other portion of a lead 20, 20'.

Within envelope 12 and mounted on stem assembly 18 is an electrode assembly 30. The electrodes in electrode assembly 30 include a cathode 32, a pair of grids 34 and 36, a beam plate 38, and an anode 40. Only the anode 40 and the ends of the other electrodes are visible. The electrodes are mounted in spaced apart relation between a pair of insulating spacer plates 42 (only the lower of which is shown). The lower ends of the electrodes 32, 34, 36, and 38 are secured to the upper ends of leads 20, 20' within envelope 12. A connector (not shown) is electrically secured to the anode 40 within the top end of envelope 12 and the conductor is sealed through the dome end of the bulb 14 and electrically secured to a terminal or a top cap 44.

Welded to one or more leads 20' within envelope 12 and adjacent wafer 16 is a piece of radioactive material 48. In the present embodiment the radioactive material 48 comprises a tab of radioactive nickel, known as Ni–63. The nickel tab emits beta rays and has a half-life of 86 years.

Bulb 14 is made of lime glass, known commercially as 0080 glass, and the wafer 16 is made of lead glass, known as 0012 glass. Lime glass is about 1/5 the cost of lead glass and its use in bulbs is preferred for this reason. Lime glass is normally not used for stem wafers since lead glass has a much higher resistivity than lime glass and is used to prevent current leakage between the relatively closely spaced leads passing through the stem wafer.

The use of bulbs made of lime glass in certain high voltage electron discharge devices has, in the past, been generally impractical due to the rapid decomposition of the lime glass by electrolysis. Also, in certain instances even the use of lead glass has not been found adequate to provide sufficiently long life of the devices.

As mentioned, it is believed that the decomposition of the glass during electrolysis is caused by the movement of ions through the glass. Thus, for example, if a pair of electrodes having a DC potential therebetween are sealed through the glass, a current will pass through the glass between the leads. The current is carried by the movement of charged ions. Because of the relatively large size of the silicate ions present in the glass, and the large size of the lead ions present in lead glass, it is believed that the main portion of the current is carried by smaller positive sodium ions present in the glass. The positive sodium ions migrate towards the negative terminal where they become sodium atoms. In lead glass, the sodium atoms reduce the lead oxide molecules to lead and form "lead trees" around the negative electrode. As known, the presence of the lead trees permit gas leakage through the glass envelope. Also, the portions of the glass which are depleted of their sodium ion content become porous and permit leakage of air therethrough.

According to one theory, it is thought that beta rays which are electrons, neutralize the sodium ions and prevent migration of the sodium ions. Because of this, depletion of sodium from portions of the glass does not occur and formation of the "lead trees" around the negative electrodes is inhibited. That is, although the sodium ions become sodium atoms, the process occurs throughout the glass rather than only at the negative electrode.

A further cause of ion movement is believed to be caused by electron bombardment of the inside wall of the electron discharge device glass envelope. It is known that when a glass wall is bombarded by primary electrons having energy levels within certain values, secondary electrons will be emitted from the wall in sufficient numbers to cause the bombarded surface of the wall to acquire a positive voltage with respect to the unbombarded surface of the wall. Under these conditions, it is thought that oxygen ions migrate through the glass wall to the bombarded surface of the wall where they give up their excess electrons and become free oxygen. As is known, oxygen within electron tubes causes poisoning of the cathodes.

According to one theory, it is thought that the beta rays do not liberate a sufficient number of secondary electrons to cause the glass surface to become positively charged. Thus, since the beta rays are negatively charged, the presence of the beta rays within the glass neutralizes the positive charge on the glass caused by the primary bombarding electrons. Thus, the migration of the oxygen ions is inhibited.

It is to be understood that the manner in which applicant's invention operates to retard electrolysis is not fully understood and that applicant does not intend to limit his invention in any way by the above-described theories. It is true, however, that the use of radioactive material retards the rate at which electrolysis occurs.

In one test, for example, type RCA 6JE6 tubes were made with lime glass bulbs and lead glass stems, some of the tubes having radioactive nickel–63 tabs therein, and the other tubes not having these tabs. After 500 hours of operation, it was observed that the tubes without the tabs showed marked signs of electrolysis. The tubes having the radioactive tabs showed little or no evidence of electrolysis. After an additional 1000 hours of operation, the tubes with the tabs showed less electrolysis than shown by the tabless tubes at 500 hours.

In another test using RCA type 6BK4 tubes having lead glass bulb and stems, after 1000 hours of operation tubes without radioactive tabs showed marked signs of electrolysis while tubes having radioactive nickel–63 tabs showed very little evidence of electrolysis. Also, after 1000 hours of operation, some of the tubes without the tabs failed for reasons of gas within the tubes, while all of the tubes with the tabs were still operable.

Although the invention has been described in connection with electron discharge devices having glass envelopes, and wherein the electrolysis occurs in the envelope, it is clear that the invention has utility in other types of devices. Thus, in metal envelope tubes, for example, the invention has utility in preventing electrolysis in the glass stems used in metal tubes. Other examples will be apparent to those skilled in the art.

I claim:
1. An electron discharge device having an envelope including a stem having a lead glass wafer and a lime glass bulb, said envelope being evacuated, an electrode assembly mounted on said stem within said envelope, and a source of beta rays mounted within said envelope and outside said electrode assembly for irradiating portions of said envelope with beta rays.

2. An electron discharge device including an envelope and an electrode assembly mounted within said envelope, said envelope being hermetically sealed and comprising a lime glass bulb and a lead glass stem wafer, said envelope being evacuated, one of the electrodes of said electrode assembly having an electrical connection extending through one end of said bulb, and another of the electrodes having an electrical connection extending through said stem wafer, and a radioactive nickel–63 tab disposed adjacent to said stem wafer for irradiating portions of said envelope with beta rays.

3. An electron discharge device including an envelope and an electrode assembly mounted within said envelope, said envelope being hermetically sealed and comprising a lime glass bulb and a lead glass stem wafer, said envelope being evacuated, electrodes in said mount assembly each having an electrical connection extending through said stem wafer, and a radioactive nickel–63 tab disposed adjacent to said stem wafer for irradiating portions of said envelope with beta rays.

References Cited

UNITED STATES PATENTS

| | | | |
|---|---|---|---|
| 1,226,383 | 5/1917 | Robinson | 313—55 X |
| 2,672,567 | 3/1954 | Alvarez | 250—106 X |
| 2,990,492 | 6/1961 | Wellinger et al. | 313—54 |
| 3,110,834 | 11/1963 | Schneider et al. | 313—54 |

FOREIGN PATENTS 840,582   7/1960   Great Britain.

DAVID J. GALVIN, *Primary Examiner.*

ROBERT SEGAL, *Examiner.*